May 15, 1962  J. M. EASTMAN  3,034,569
FUEL FEED AND POWER CONTROL FOR GAS TURBINE ENGINES
Filed April 9, 1956  2 Sheets-Sheet 2

INVENTOR.
JAMES M. EASTMAN
BY
Robert C. Smith
ATTORNEY

United States Patent Office 3,034,569
Patented May 15, 1962

3,034,569
FUEL FEED AND POWER CONTROL FOR
GAS TURBINE ENGINES
James M. Eastman, South Bend, Ind., assignor to The Bendix Corporation, a corporation of Delaware
Filed Apr. 9, 1956, Ser. No. 577,001
5 Claims. (Cl. 158—36)

The present invention is concerned with fuel control systems for gas turbine engines and more particularly with a system for metering fuel to a gas turbine engine during acceleration in such manner that the fuel supplied is always in the amount necessary to provide optimum acceleration.

During acceleration of a gas turbine engine, such as a turbojet engine, the fuel feed must be limited. Customarily, limiting is done to avoid excessive turbine temperatures and compressor stall. It has always been desired, however, to feed fuel at a maximum rate, short of these limits, which will obtain a maximum rate of engine acceleration and thus the best response of the engine to demands for power. Modern engines are becoming increasingly rugged, however, in their ability to withstand brief periods of over-temperature and small excursions into the stall region of compressor operation. Further, if engine acceleration is at a maximum rate, the shorter acceleration period reduces the adverse effects on the enggine of exceeding the turbine temperature and stall fuel flow limits. For these reasons, a fuel feed system capable of supplying fuel at the optimum acceleration rate may provide the best type of acceleration control for such engines.

It is, therefore, an object of this invention to provide a fuel control which will continuously meter fuel at that flow which will maintain the maximum acceleration rate of which the engine is capable.

It is another object to provide governing means compatible with the acceleration control means and the necessary switching means for transition between acceleration optimizing and speed governing modes of fuel metering.

Other objects and advantages will become apparent from the specification taken in connection with the accompanying drawings, in which.

for a given speed (N) is plotted against fuel flow ($W_f$).

Figure 7:
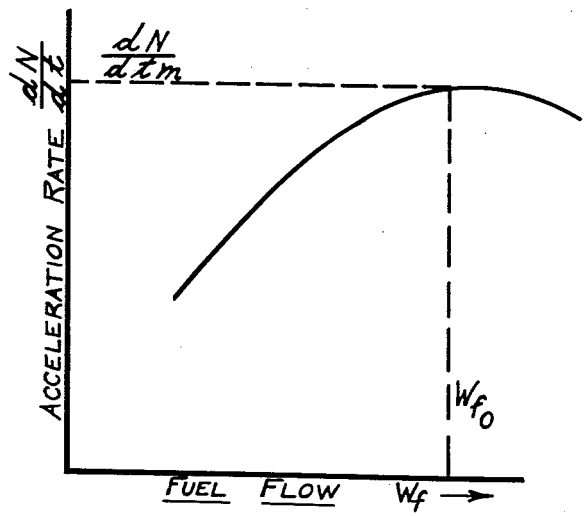
FIGURE 7 is a graph in which acceleration rate $$\left(\frac{dN}{dt}\right)$$

For any given speed, it can be shown that if the engine acceleration rate is plotted against fuel flow, the resulting curve would appear like that shown in FIGURE 7 wherein maximum engine acceleration rate $$\frac{dN}{dt_m}$$

is obtained with optimum fuel flow ($W_{f_0}$). For other operating speeds this curve maintains its same general characteristic shape. Note that at optimum flow the tangent to the curve is horizontal, i.e., the acceleration rate is insensitive to small changes in fuel flow. The slope of the tangent is zero. At fuel flows less than optimum this slope is positive and at flows greater than optimum the slope is negative. If a small amplitude flow pulsation is added to the fuel flow, the engine would normally respond with a small amplitude fluctuation of speed and acceleration. As the mean fuel flow is increased, it can be seen that the amplitude of engine speed and acceleration fluctuation resulting from this flow pulsation would progressively decrease until it would become essentially zero at optimum fuel flow. As the mean flow increases above optimum value, the engine would start fluctuating speed and acceleration again with increasing amplitude but with the engine fluctuation now shifted 180 degrees in its phase relation with the fuel flow pulsation because of the negative response of the engine as indicated by the negative slope on FIGURE 7. It is the function of the device shown herein to maintain accelerating flow at its optimum by introducing a small amplitude fuel flow pulsation of high enough frequency to prevent excessive speed fluctuation amplitude, by sensing the engine response to this fuel flow pulsation, and by continuously correcting the mean fuel flow to reduce engine response amplitude, thus maintaining operation at the zero slope point on FIGURE 7.

Figure 1:
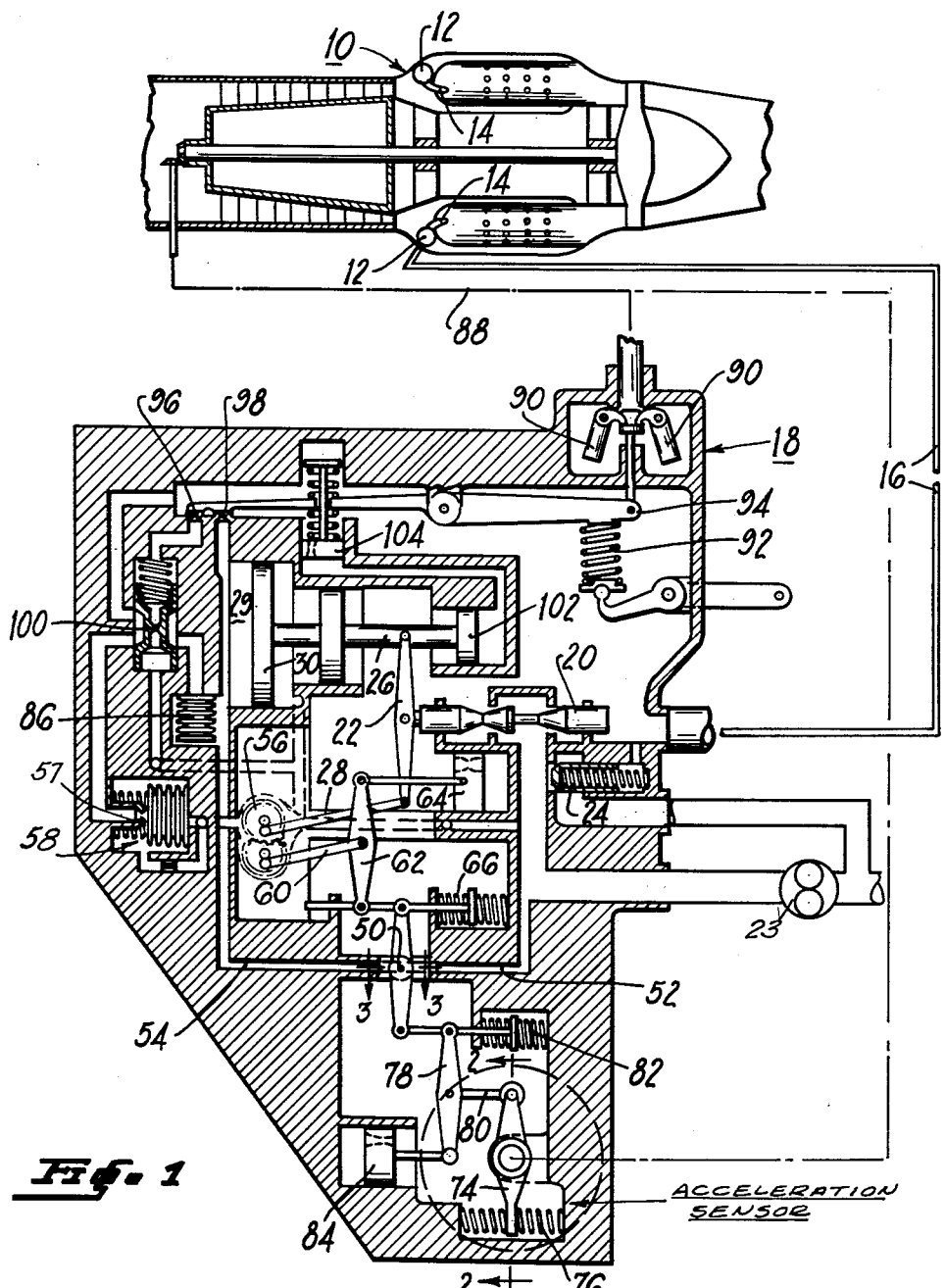
FIGURE 1 is a schematic diagram of my fuel system shown in conjunction with a gas turbine engine.

Referring now to FIGURE 1, a gas turbine engine is shown generally at numeral 10 having positioned therein a fuel manifold 12 which distributes fuel to a series of nozzles 14. Fuel is supplied to the manifold 12 through a conduit 16 which receives fuel from a metering unit shown generally at 18.

In metering unit 18 a main fuel valve 20 which preferably is of logarithmic contour so that equal travel increments always give equal percent changes in valve area is positioned axially through the action of a link 22. Fuel is supplied under pressure to the unit 18 from a source, not shown, by means of a pump 23. A by-pass valve 24 maintains a constant metering head across valve 20. Through link 22 the valve 20 is positioned by the sum of the movements of a piston shaft 26 and a link 28. The piston shaft is controlled by varying the pressure control in a chamber 29 which is exerted against the piston 30 of shaft 26. This control pressure is derived from a fuel conduit connected in parallel with the main metering valve and therefore must seek a value between the system supply pressure and the metered fuel or discharge pressure. The differential area pistons connected to shaft 26 and their venting are such that the piston shaft 26 is balanced when the control pressure is approximately the average of the servo supply and discharge pressures. It will be noted that these pressures are the same as for the valve 20.

Figure 3:
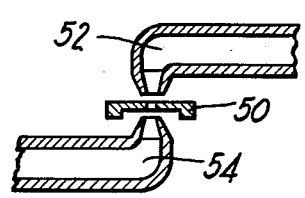
FIGURE 3 is a cross-sectional view taken on line 3—3 of FIGURE 1.
Figure 4:
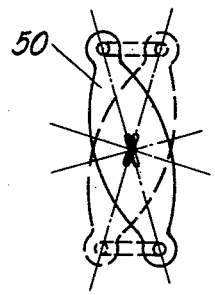
FIGURES 4, 5 and 6 show the kinetic valve of FIGURES 1 and 3 in different operating positions.
Figure 5:
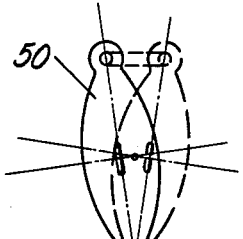
Figure 6:
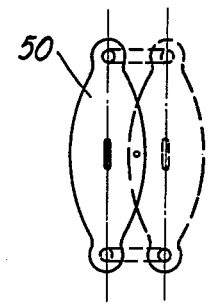

The control pressure in chamber 29 is established through the action of a kinetic valve 50, which may be more easily understood by reference to FIGURES 3 through 6. FIGURE 3 is a cross-sectional view taken on line 3—3 of FIGURE 1. From this view it will be seen that this valve structure consists of a pair of conduits 52 and 54 having orifices in direct alignment with each other. Communication between these orifices is controlled by means of the movable valve member 50, which is shown in FIGURE 3 in the position allowing maximum flow between conduits 52 and 54. It will be seen from FIGURES 4, 5 and 6 that member 50 can be caused to assume a number of positions and to move in a number of different ways. As shown in FIGURE 4, the ends of valve 50 are oscillated in opposite directions in such manner as to hold the center of said member and therefore the orifice between conduits 52 and 54 substantially still thereby allowing a maximum amount of communication between passages 52 and 54. As shown in FIGURE 5, however, the bottom of member 50 is held still and the top is allowed to oscillate thereby causing the orifice in member 50 to be aligned with the orifices in passages 52 and 54 for only a limited percentage of the time. As a result, a movement such as that shown in FIGURE 5 would allow a considerably lower fluid pressure to exist downstream of member 50 than would be the case if member 50 were moving as shown in FIGURE 4. In FIGURE 6, both ends of member 50 are moving in the same direction at the same time thereby moving the orifice very rapidly between the point of alignment between passages 52 and 54. This results in an even smaller flow into passage 54 than in the case of FIGURE 5 and an even lower fluid pressure being developed downstream of passage 54 and, hence, a lower pressure in chamber 29 against piston 30 and shaft 26. From the foregoing it will be understood that when valve member 50 is centered, high pressure fuel forms a jet between passages 52 and 54 and practically all of this pressure is developed against piston 30 thus causing the piston shaft 26 to move the fuel valve 20 in the opening direction. When member 50 is displaced to fully or substantially interrupt the jet, the conduit 54 and the chamber 29 becomes subjected to a low pressure and the piston shaft 26 moves the fuel valve 20 in a closing direction.

The link 28 is positioned by a crank on a small hydraulic motor 56. The motor turns at constant speed because its fuel flow is metered through an orifice 57 by a head regulator valve 58. Thus, link 28 adds a uniform small reciprocating stroke to the fuel valve 20 and generates a fixed frequency constant percentage pulsation in the fuel flow delivered to the engine, while the mean flow is controlled by valve member 50 via piston shaft 26. Also connected to fluid motor 56 is a link 60 which moves the center of a lever 62 with the frequency of the flow pulsation and at a fixed amplitude. This motion is transferred to the bottom of the lever. A dashpot 64 and centering springs 66 serve only to restore the position of the bottom of lever 62 to its mean centered position whenever the hydraulic motor 56 is not running.

Figure 2:
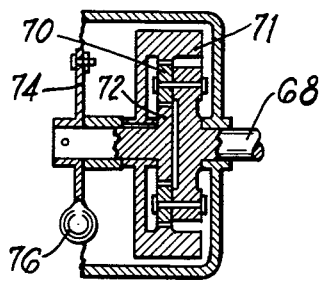
FIGURE 2 is a cross-sectional view taken on line 2—2 of FIGURE 1.

FIGURE 2 shows a cross-sectional view taken on line 2—2 of FIGURE 1. This structure generally shows acceleration sensing means wherein a shaft 68 is driven by the engine and drives the pinions 70 in the planetary gear set shown. The ring gear is a part of an inertia flywheel 71. The sun gear 72 is essentially stationary and is connected to a lever 74. Springs 76 act to hold the lever 74 and the sun gear in a centered position. When the engine is running at constant speed, the flywheel 71 turns at approximately twice the speed of shaft 68 and the lever 74 is held centered by springs 76. When the engine is accelerating at a constant rate, the inertia of flywheel 71 reacts through the pinions on the sun gear causing lever 74 to displace from its centered position an amount such that the springs 76 supply a restoring torque equal to the reaction torque on the sun gear 72. The moment of inertia of the flywheel 71 and the rate of springs 76 establish a resonant frequency such that the lever 74 becomes very sensitive to any fluctuations in the speed of shaft 68 that occur at this frequency. Lever 74, then, oscillates with an amplitude proportional to the strength of any engine acceleration fluctuation which occurs at its resonant frequency. The resonant frequency is tuned to be the same as the fuel flow pulsation frequency, as established through the action of fluid motor 56.

Since the movement of lever 74 reflects both the engine speed fluctuation response to the fuel flow and its general level of acceleration, it is desired to remove the effect of the displacement of the average position of piston shaft 26 caused by the general level of acceleration. Accordingly, lever 74 is connected to a lever 78 through a link 80. A pair of centering springs 82 permit resonant motion of the top of lever 78, but urge it toward a centered mean position. A dashpot 84 essentially prevents the bottom of lever 78 from moving with resonant motion, but permits it to move in response to the centering action of springs 82. The top of lever 78 thus remains essentially centered in mean position and piston 84 moves to compensate mean acceleration trends as reflected in the movement of the mean position of lever 74. During an acceleration, the bottom of lever 78 and the piston 84 move to the left. The top of lever 78, therefore, oscillates at the fuel pulsation (and resonant) frequency with an amplitude proportional to the engine acceleration fluctuation amplitude and with an essentially fixed mean position. The bottom of valve member 50, of course, follows this same motion.

The phase relation of cranks 28 and 60 is adjusted so that when operation of the engine 10 is on the left side (positive slope) of the curve of FIGURE 7, with maximum engine response to the fuel flow pulsation, the top of the lever 78 will be displacing opposite in direction to the displacement of the bottom of lever 62, the motion of lever and valve 50 will appear as shown in FIGURE 4. Note that for this condition the valving slot of lever 50 stays essentially centered over the orifices in conduits 52 and 54, causing a high pressure to be exerted on piston 30 and causing piston shaft 26 to move the main fuel valve 20 in an opening direction. As the mean fuel flow to the engine increases, the amplitude of the engine response to the flow pulsation reduces as indicated by the curve of FIGURE 7 until at optimum fuel flow there is essentially no engine response and no resonant motion of the bottom of lever 50. This is indicated by FIGURE 5. Note that now the valve slot of lever 50, instead of remaining centered, moves with a fixed amplitude established by the geometry of the hydraulic motor drive mechanism. As the slot moves across the orifice in conduit 52, it permits two pressure pulses to be received in conduit 54 per cycle of flow pulsation. The duration of these pulse establishes the average control pressure on piston shaft 26. This duration is determined by the velocity of movement of the slot in lever 50 across the orifice in conduit 52, which velocity is, in turn, established by the amplitude of movement. By appropriate design of the pistons and the valving, the average control pressure which exists for the optimum flow condition may be made the null or balanced condition pressure for piston shaft 26, i.e., the mean opening of fuel valve 20 would stop increasing when optimum fuel flow is obtained.

If, for any reason, optimum flow should be exceeded, the engine would again start responding to the fuel flow pulsing, but now with a 180 degree phase shift—i.e., with response negative as compared with sub-optimum fuel flows. The resulting behavior of lever 50 is shown in FIGURE 6. Note that the amplitude of motion of the valving slot is now increased further. Its velocity as it passes over the orifice of passage 52 is correspondingly increased. The duration of the pressure pulses received in conduit 54 and the average control pressure for piston shaft 26 are accordingly reduced, causing the piston shaft to move fuel valve 20 in the decreasing flow direction and tending to restore the optimum fuel flow.

To avoid having the fuel valve 20 respond to a pulsing control pressure supplied to piston shaft 26, a hydraulic pressure pulse filter is indicated at numeral 86. This serves to average the pressure pulses received in chamber 29 so that a relatively steady control pressure is held and piston shaft 26 responds essentially only to the average opening at valve 50. By selection of the mass and spring rate of member 86, it can be made to resonate at the frequency of the pulses received in said chamber and therefore be a very effective filter to remove pressure pulses at this frequency.

An engine driven shaft 88 drives a pair of flyweights 90 which oppose the force exerted by a calibrating spring 92 for governing action. During acceleration, the spring 92 exerts a force on a lever 94 which acts to hold a pair of valve openings 96 and 98 closed. As the governor setting is approached, valves 96 and 98 are opened by lever 94. Opening of valve 96 by a very slight amount causes a relay valve 100 to immediately close off the fuel discharge line from the hydraulic motor 56 and the vent line to the accumulator or hydraulic filter 86. The hydraulic motor, the fuel flow pulsing and the engine r.p.m.

fluctuation response all stop. The centering springs restore the valve slot in lever 50 to center and conduit 54 and chamber 29 take the full discharge from the orifice in passage 52. Valve 98 now regulates the control pressure on the piston 30 and thereby the main fuel valve opening. Governing is established when lever 94 opens valve 98 enough to bring the control pressure down to its equilibrium value. A piston 102 on the right end of shaft 26 coacts with a piston 104 to provide a valve position feedback thereby giving proportional plus floating governing action. The locking of the hydraulic pressure pulse filter-accumulator 86 prevents its introducing lag or "spongy" action of the piston shaft 26 in response to movement of the pilot valve at 98 during governing.

Although only one embodiment is shown and described herein, various changes in the form and arrangement of the parts may be made to suit requirements.

I claim:

1. A device for controlling fuel flow to an engine comprising a conduit, a metering valve in said conduit, an all-speed governor operatively connected to said valve, means for maintaining a constant pressure drop across said valve, a fluid motor and means providing a constant flow through said motor such that said motor operates at constant speed, a linkage between said motor and said valve for transmitting a constant amplitude, constant frequency oscillation to said valve and hence, to said fuel flow, pressure responsive means operably connected to said valve and to said governor, a second valve for controlling the fluid to said fluid pressure responsive means, means connecting said second valve to said fluid motor whereby a constant amplitude, constant frequency oscillation is applied to said second valve, and acceleration responsive means resonant to said frequency and responsive to the amplitude of engine acceleration fluctuation resulting from oscillation of said fuel flow connected to modify the oscillatory action of said second valve for controlling the average opening of said valve during acceleration.

2. A device for metering fuel to an engine comprising a metering valve, means for maintaining a constant pressure drop across said metering valve, means for controlling the area of said valve including a link attached at its center to said valve, at one end to a shaft carrying a plurality of lands, and at the other end to a second link, a hydraulic motor operably connected to said second link in such manner that a constant speed rotary movement of said motor is converted into an oscillatory movement of said valve of constant amplitude and frequency, and means responsive to the amplitude of engine acceleration fluctuation resulting from said oscillatory movement of said valve for varying a control pressure acting to position said shaft.

3. A device for controlling fuel flow to a gas turbine engine comprising a conduit connected to said engine, a metering valve in said conduit, an engine speed governor operatively connected to said metering valve, means for maintaining a constant pressure drop across said metering valve, motor means for transmitting a constant amplitude, constant frequency oscillation to said metering valve and hence to said fuel flow, a cylinder and a piston in said cylinder operably connected to said metering valve and to said governor, a second conduit connecting said cylinder and piston with a source of fluid under high pressure, an orifice in said conduit and an elongated valve member for controlling the flow through said conduit having a port located near the center thereof adapted for registry with said orifice, means connecting one end of said valve member with said motor means whereby a constant amplitude, constant frequency oscillation is imparted to said one end, and acceleration responsive means resonant to said frequency and responsive to the phase and amplitude of engine acceleration fluctuation resulting from oscillation of said fuel flow connected to the opposite end of said valve member, the phasing of said motor means and said acceleration responsive means being such that minimum effective registry of said port with said orifice occurs when the average fuel flow past said metering valve exceeds that which provides maximum acceleration of said engine.

4. A device for controlling fuel flow to an engine comprising a fuel conduit connected to said engine, a metering valve in said conduit, motor means for imparting a constant amplitude, constant frequency oscillation to said metering valve and hence to said fuel flow, a cylinder and a piston in said cylinder operatively connected to said metering valve, a second conduit connecting said cylinder and said piston to a source of fluid under pressure, an orifice in said conduit and an elongated valve member for controlling the flow through said conduit having a port located near the center thereof adapted for registry with said orifice, means connecting one end of said valve member with said motor means whereby said oscillation is imparted to said one end, and acceleration responsive means resonant to said frequency and responsive to the phase and amplitude of engine acceleration fluctuation resulting from oscillation of the fuel flow connected to the opposite end of said valve member, the phasing of said motor means and said acceleration responsive means being such that minimum flow is permitted past said valve member to said piston when the average flow past said metering valve exceeds that which provides maximum acceleration of said engine.

5. A device for controlling fuel flow to an engine comprising a fuel conduit connected to said engine, means for imparting a constant frequency oscillation to said metering valve and hence to said fuel flow, a chamber and movable wall means in said chamber operatively connected to said metering valve, a second conduit connecting said chamber with a source of fluid under pressure, an orifice in said conduit and an elongated valve member for controlling the flow through said conduit having a port located near the center thereof for registry with said orifice, means connecting one end of said valve member with said oscillation imparting means whereby said oscillation is imparted to said one end, and acceleration responsive means resonant to said frequency and responsive to the phase and amplitude of engine acceleration fluctuation resulting from oscillation of the fuel flow connected to the opposite end of said valve member, the phasing of said oscillation imparting means and said acceleration responsive means being such that minimum flow is permitted past said valve member to said chamber when the average flow past said metering valve exceeds that which provides maximum acceleration.

References Cited in the file of this patent

UNITED STATES PATENTS

| | | |
|---|---|---|
| 2,633,830 | McCourty et al. | Apr. 7, 1953 |
| 2,662,372 | Offner | Dec. 15, 1953 |
| 2,672,335 | Keller | Mar. 16, 1954 |
| 2,720,751 | Kunz | Oct. 18, 1955 |
| 2,748,565 | Billman et al. | June 6, 1956 |
| 2,750,741 | Leeper | June 19, 1956 |
| 2,761,284 | Malick | Sept. 4, 1956 |
| 2,842,108 | Sanders | July 8, 1958 |
| 2,941,601 | Best | June 21, 1960 |

OTHER REFERENCES

Draper, C. S., and Li, Y. T.: "Principals of Optimalizing Control Systems and an Application to the Internal Combustion Engine," ASME, September 1951, pp. 39–41.